April 14, 1964            J. C. WHITING            3,128,743

DIFFERENTIAL PRESSURE RESPONSIVE DEVICE

Filed May 26, 1961

INVENTOR.
JAMES C. WHITING
BY
William N. Antonis
ATTORNEY

April 14, 1964  J. C. WHITING  3,128,743
DIFFERENTIAL PRESSURE RESPONSIVE DEVICE
Filed May 26, 1961  2 Sheets-Sheet 2

INVENTOR.
JAMES C. WHITING
BY William N. Antonia
ATTORNEY 3,128,743
DIFFERENTIAL PRESSURE RESPONSIVE DEVICE
James C. Whiting, Madison Heights, Mich., assignor to The Bendix Corporation, a corporation of Delaware
Filed May 26, 1961, Ser. No. 112,837
6 Claims. (Cl. 116—70)

This invention relates to differential pressure responsive devices and more particularly to a temperature sensitive magnetically operated differential pressure indicating device.

Differential pressure sensing devices are widely used in industry and in the filter industry in particular. Such devices normally sense changes in pressure drop across a filter element when the element becomes clogged and indicate in some manner or another that the filter element should be replaced. Since the viscosity of fluids increases greatly at low temperatures, and abnormally high pressure drops will occur across a filter element under such circumstances, even though the element is clean, many devices have utilized various types of temperature controlled mechanisms for preventing false indications at such low temperatures.

Accordingly, it is an object of this invention to provide a novel, simple differential pressure indicating device which will indicate a given differential pressure only at temperatures above a predetermined value.

Another object of this invention is to provide an indicator which will continue to indicate the clogged condition of the filter even after the apparatus with which the filter is associated has ceased to operate.

A further object of this invention is to provide an indicating device which utilizes a novel arrangement of magnets to cause an indicator pin to be magnetically moved from a non-signalling to a signalling position at differential pressures above a predetermind value, solely by the magnetic forces exerted thereagainst.

More particularly, it is an object of this invention to provide an indicating device comprising first magnetic means which is operatively connected to a differential pressure sensing piston and second magnetic means which is movable from a non-signalling to a signalling position wherein said second magnetic means is magnetically retained in said non-signalling position by said first magnetic means at differential pressures below a predetermined value and is magnetically moved towards said signalling position by said first magnetic means when said first magnetic means and piston move at differential pressures above a predetermined value. In the embodiment shown this is accomplished by utilizing the principle that magnetic poles of like kind repel each other.

A still further object of this invention is to provide an indicating device of the type described which incorporates a bimetallic dished or convex disc element which will invert to prevent movement of the indicator pin to a signalling position at temperatures below a predetermined value.

Another object of this invention is to provide an indicator of the type described in which the number of seals and friction problems are substantially reduced when compared to other devices of this general type.

A further object of this invention is to provide a unique compact indicator which may be easily and inexpensively fabricated.

The above and other objects and features of the invention will become apparent from the following description of the mechanism taken in connection with the accompanying drawing which forms a part of this specification and in which:

FIGURE 6 is an enlarged sectional view of the upper portion of the indicator device.

Figure 1:
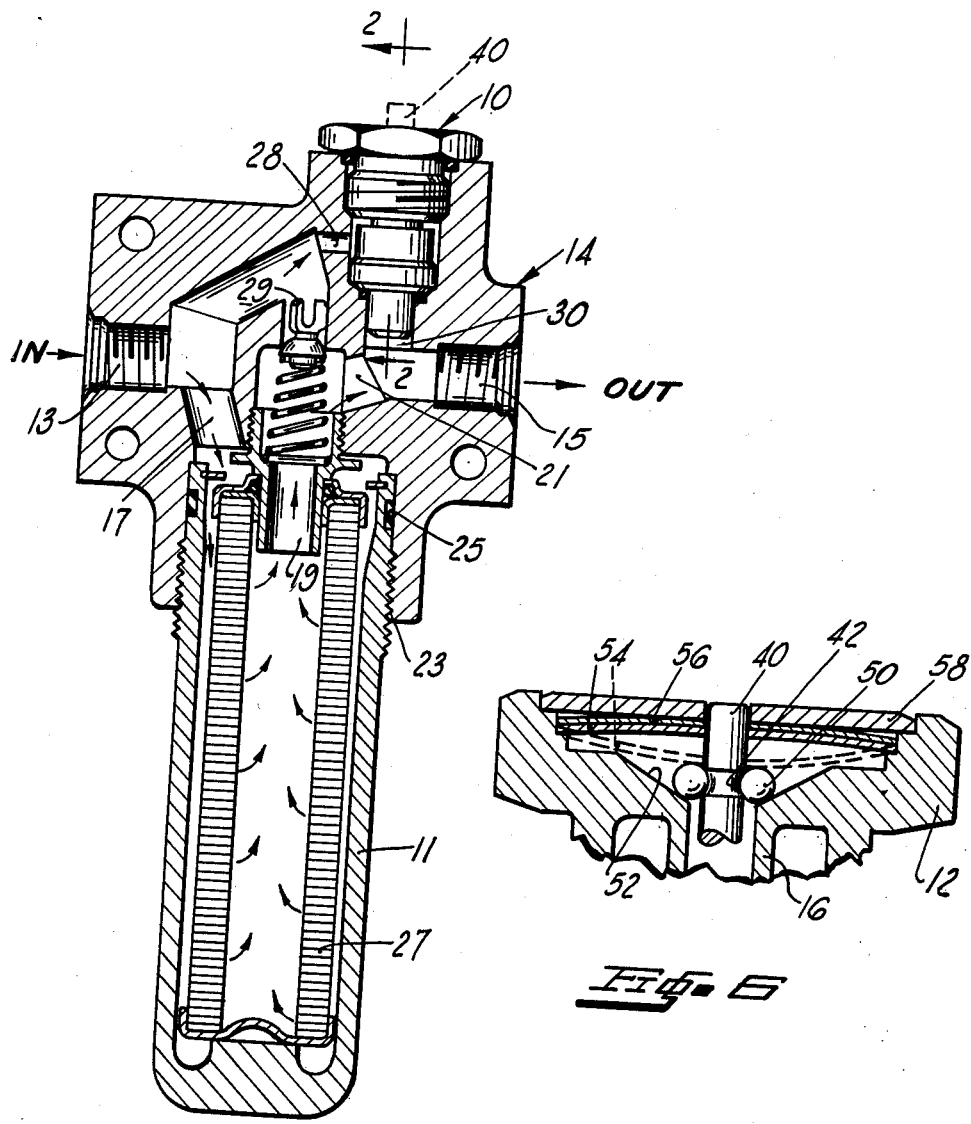
FIGURE 1 is a sectional view of a filter unit incorporating my indicating device.

Referring to FIGURE 1, numeral 14 indicates a filter head having an inlet port 13 and an outlet port 15 which communicate with each other via passage 17, filter bowl 11, and passages 19 and 21, respectively. The bowl is secured in place to the lower side of head 14 via screw threads 23 and is sealed thereto in fluid tight relationship via an O-ring gasket 25. A suitable filter element 27 is disposed in the fluid bowl in such a manner that fluid flowing between the inlet port 13 and the outlet port 15 will flow therethrough, from the outside-in, as indicated by the arrows. A fluted bypass valve 29 may be provided in the filter head to permit the fluid to pass directly from inlet port 13 to outlet port 15 when the filter element 27 becomes clogged with foreign matter to such an extent that fluid flow therethrough is seriously restricted. An indicator 10 is located in the filter head 14 for indicating when the filter element 27 has become clogged. Brackets (not shown) may be provided for mounting the device on an engine or other mechanism.

Figure 2:
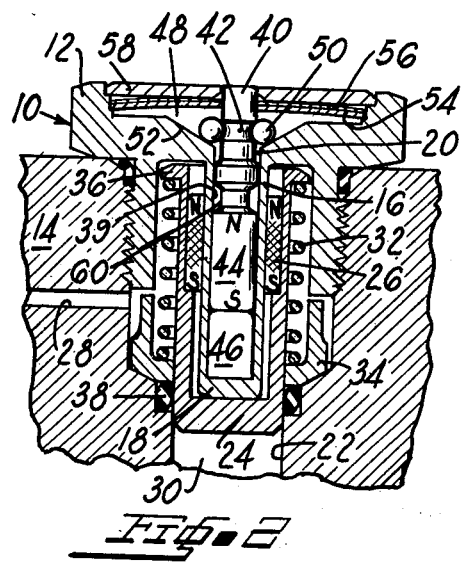
FIGURE 2 is a sectional view of the indicating device, taken substantially along line 2—2 of FIGURE 1 showing the position of the components thereof at differential pressures below a predetermined value and at temperatures above a predetermined value.
Figure 3:
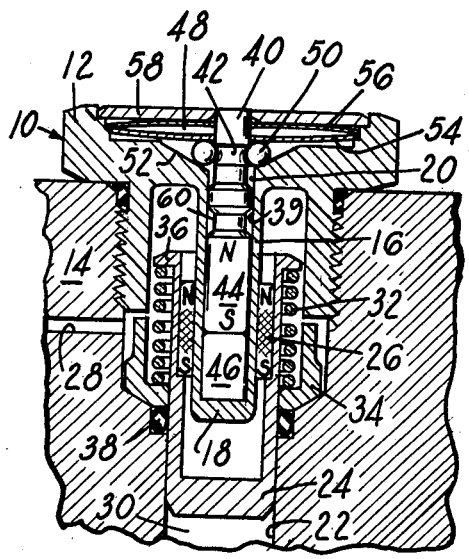
FIGURE 3 is a sectional view, similar to that of FIGURE 2, which shows the position of the components at differential pressures above a predetermined value, but at temperatures below a predetermined value.
Figure 4:
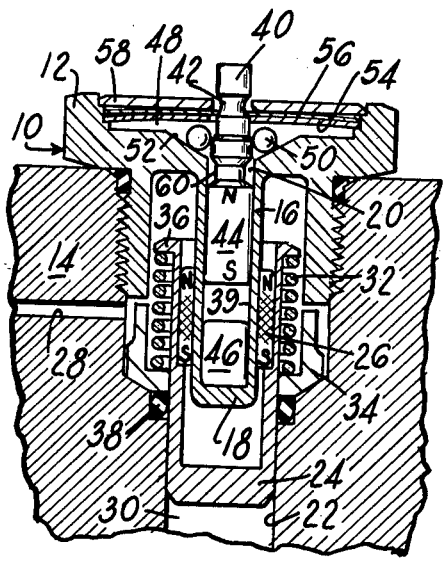
FIGURE 4 is a sectional view, similar to that of FIGURE 2, which shows the device in a signalling position when differential pressures above a predetermined value occur at temperatures above a predetermined value.

Referring to FIGURES 2–5 it will be noted that the indicator 10 includes a fitting 12 which is threaded into the filter head 14. A hollow tubular member 16, having one end 18 closed and the other end 20 open, is integral with the fitting 12 and extends into a bore 22 formed in filter head 14. Located in bore 22 is a hollow piston member 24 which is slidable therein from a first or normally neutral position, as shown in FIGURE 2, to a second position away from said neutral first position, as shown in FIGURES 3 and 4. The piston member is formed so as to envelop the tubular member 16 and carries a magnetic sleeve-like element 26 which is suitably attached thereto. Passage 28 communicates the upper side of the piston member 24 with filter inlet pressure while passage 30 communicates the lower side of the piston member with filter outlet pressure. A spring 32, which is utilized to oppose movement of the piston member away from its normally neutral position, abuts a spring retainer 34 at one end and a radially extending flange 36 formed on the piston member at the other end. An O-ring packing 38 is utilized to prevent leakage along the outer wall of piston member 24. Located within the tubular member 16 in bore 39 is an indicator pin 40 having an annular groove 42 formed thereon, a magnetic element 44, and a steel slug 46 which may or may not be used, as desired. Located at the open end of tubular member 16 in a chamber 48 are a plurality of balls 50 which are capable of moving along annular ramp 52 into and out of the annular groove 42. Also located in chamber 48 is a temperature sensitive bimetallic convex disc 54 and a spring washer 56, both of which are retained in position by a cover 58. The bimetallic disc, which has an opening at the center thereof to permit movement of the indicator pin 40 therethrough, is confined at its periphery by the spring washer 56 and cover 58 and is designed to invert at temperatures below a predetermined value.

Operation of the device is as follows: As long as the filter to which the indicator is attached is clean, the piston 24 will remain in its normally neutral position and the magnetic element 26 will retain the magnetic element 44 and consequently, the indicator pin 40 in a non-signalling position. This is accomplished, as shown in FIGURE 2, by arranging the poles of outer and inner magnetic elements 26 and 44 in such a manner that the elements will repel each other. Thus it can be seen in FIGURE 2 that magnetic repulsion is preventing any movement of magnetic element 44. If additional forces are required to prevent spurious movements of magnetic element 44, a steel slug 46 may be utilized, as shown, to attract inner magnetic element 44, but such a slug is not necessary to the practice of this invention. The use of the slug serves no purpose except to increase the force required to extend the indicator pin to a signalling position.

When the filter to which the indicator is attached starts to get clogged, the increased pressure drop across the filtering element will be such that the force created by the filter inlet and outlet pressures acting on piston 24 will exceed the force exerted by the spring 32, thereby causing the piston to begin moving away from its normally neutral position. As the differential pressure attains a predetermined maximum value, the piston 24 will have moved to a position such as is shown in FIGURES 3 and 4. When such movement of the piston away from neutral occurs, the outer magnetic element 26 will be in position to overcome any forces which tend to hold the inner magnetic element 44 and indicator pin in a non-signalling position. With the piston and outer magnetic element in the position shown in FIGURES 3 and 4, the inner magnetic element 44 and indicator pin will be magnetically moved by the outer magnetic element 26 through means of magnetic repulsion to a signalling position as shown in FIGURE 4. However, if the temperatures involved are below a predetermined value at the time of piston movement, the bimetallic element will be in an inverted postion, as shown in FIGURES 3 and 6, so as to contact and maintain balls 50 in annular groove 42 and prevent the indicator pin from moving to a signalling position.

Figure 5:
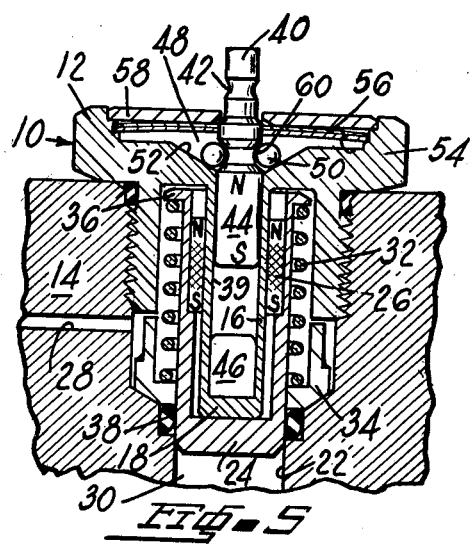
FIGURE 5 is a sectional view, similar to that of FIGURE 2, which shows the position of the components after the apparatus with which a clogged filter is associated has ceased to operate.

If the temperatures involved are above the predetermined value and the indicator pin has been partially extended through means of magnetic repulsion, as shown in FIGURE 4, return of the piston 28 to its normal position will cause the inner magnetic element 44 and indicator pin 40 to be magnetically moved to the limit of their travel, as shown in FIGURE 5. At this time the balls 50 will be attracted by the inner magnet into the lower groove 60 so that in order to reset the pin, the balls must be displaced radially. The friction of the skidding of the balls on the inclined surface 52 requires a deliberate push to depress the pin and reduces the possibility of the pin retracting due to shock or vibration. In the event cold temperatures have caused the bimetallic disc 54 to return to a position wherein it is in contact with the balls 50, the indicator pin may still be reset to its non-signalling position simply by pushing down thereon. Such a downward push will cause the balls to be displaced radially, thereby raising the bimetallic disc against the force of the spring washer. Without the spring washer, cold resetting would be extremely difficult due to the stiffness of the bimetallic disc.

If a system in which this indicator is installed were to start operation at a temperature below the predetermined value where the increased viscosity of the fluid would create a pressure differential sufficiently high to cause the indicator to move to a signalling position, the temperature sensitive disc would prevent indication until the temperature had risen above the predetermined value.

If due to contamination of the fluid, the pressure differential were still high enough to cause indication, the indicator pin would extend as soon as the bimetallic disc snapped back to its warm position. This is not possible in most designs, since the pressure differential must drop sufficiently for the piston to return to its normal position so as to permit the temperature sensitive element to overcome friction and disengage.

Furthermore, utilization of the previously described magnetic arrangement eliminates the necessity for using spring means or fluid pressure means to move the indicator pin to a signalling position thereby tending to reduce external leakage paths as compared to previous designs. Other features of the device are compactness and simplicity of construction and installation. These and other practical advantages which flow from my temperature sensitive magnetically operated differential pressure indicating device are believed to be obvious from the above, and other advantages may suggest themselves to those who are familiar with the art to which this invention relates.

Furthermore, although my invention has been described in connection wtih a specific embodiment, it will be obvious to those skilled in the art that various changes may be made in the form, structure, and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. A temperature sensitive differential pressure indicating device comprising a housing having a first bore therein, a hollow tubular member extending into said first bore to form a second bore, said tubular member having an open end and a closed end, an annular ramp formed at said open end of said tubular member, a hollow piston member slidable in said first bore from a first position to a second position, said piston member being formed to envelop said tubular member, first passage means formed in said housing for communicating one side of said piston member with a first pressure source, second passage means formed in said housing for communicating the other side of said piston member with a second pressure source, spring means located in said housing and operatively connected to said piston member for opposing movement of said piston member from said first to said second position, first magnetic means operatively connected to said piston member and movable therewith from said first to said second position, second magnetic means located in said second bore and movable from a non-signalling to a signalling position, said second magnetic means being magnetically repelled by said first magnetic means towards said non-signalling position when said piston member is in said first position and being magnetically repelled by said first magnetic means towards said signalling position after the piston member has moved a predetermined distance away from said first position, an indicator pin operatively connected to said second magnetic means and movable therewith from said non-signalling to said signalling position, said indicator pin having an annular groove formed thereon, a plurality of balls located at the open end of said tubular member and movable along said annular ramp into and out of said annular groove, said balls being dimensioned to protrude from the surface of said indicator pin when located in said annular groove, and a bimetallic temperature sensitive convex disc element located adjacent said balls and having an opening at the center thereof for permitting movement of said indicator pin therethrough, means for operatively connecting the periphery of said disc to said housing, said disc element being caused to invert and confine said balls in said annular groove and against said annular ramp to prevent movement of said indicator pin at temperatures below a predetermined value.

2. A differential pressure indicating device comprising a housing having a first bore therein, a hollow tubular member extending into said first bore to form a second bore, said tubular member having an open end and a closed end, a hollow piston member slidable in said first bore from a first position to a second position, said piston member being formed to envelop said tubular member, a first passage means formed in said housing for communicating one side of said piston member with a first pressure source, second passage means formed in said housing for communicating the the other side of said piston member with a second pressure source, spring means located in said housing and operatively connected to said piston member for opposing movement of said piston member from said first to said second position, first magnetic means operatively connected to said piston member and movable therewith from said first to said second position, second magnetic means located in said second bore and movable from a non-signalling to a signalling position, said second magnetic means being magnetically repelled by said first magnetic means towards said non-signalling position when said piston member is in said first position and being magnetically repelled by said first magnetic means towards said signalling position after the piston member has moved a predetermined distance away from said first position, and an indicating element located in said second bore, said indicating element being operatively connected to said second magnetic means and movable therewith from said non-signalling to said signalling position.

3. A differential pressure indicating device comprising a housing having a first bore therein, a hollow tubular member extending into said first bore to form a second bore, means for preventing communication between said first and second bores, piston means movable in said first bore toward and away from a normally neutral position, first passage means formed in said housing for communicating one side of said piston means with a first pressure source, second passage means formed in said housing for communicating the other side of said piston means with a second pressure source, resilient means operatively connected to said piston means for urging said piston means towards said normally neutral position, first magnetic means operatively connected to said piston means and movable away from said normally neutral position upon movement of said piston means away from said neutral position, and second magnetic means located in said second bore and movable from a non-signalling to a signalling position, said second magnetic means being magnetically retained in said non-signalling position by said first magnetic means when said piston means is in said neutral position and being magetically moved towards said signalling position by said first magnetic means when said first magnetic means and piston means move away from said neutral position.

4. A differential pressure indicating device comprising a housing having a first bore therein, a hollow tubular member extending into said first bore to form a second bore, means for preventing communication between said first and second bores, differential pressure sensing means located in said first bore and movable from a first position to a second position at differential pressures above a predetermined value, first magnetic means operatively connected to said differential pressure sensing means and movable therewith from said first to said second position, and second magnetic means located in said second bore and movable from a non-signalling to a signalling position, said second magnetic means being magnetically repelled by said first magnetic means towards said non-signalling position when said differential pressure sensing means is in said first position and being magnetically repelled by said first magnetic means towards said signalling position after the differential pressure sensing means has moved a predetermined distance away from said first position.

5. A differential pressure indicating device as defined in claim 4 wherein temperature sensitive restraining means is operatively connected to said second magnetic means to prevent movement thereof from said non-signalling to said signalling position at temperatures below a predetermined value.

6. A pressure indicating deivce comprising a housing, piston means located in said housing and movable toward and away from a normally neutral position, first magnetic means operatively connected to said piston means and movable away from said normally neutral position upon movement of said piston means away from said neutral position, resilient means operatively connected to said piston means for urging said piston means towards said normally neutral position, passage means formed in said housing for communicating a source of fluid under pressure with one end of the piston means to urge said piston means away from said normally neutral position, and second magnetic means movable from a non-signalling to a signalling position, said second magnetic means being magnetically repelled towards said non-signalling position by said first magnetic means when said piston means is in said neutral position and being magnetically repelled towards said signalling position by said first magnetic means after said first magnetic means and piston means have moved a predetermined distance away from said neutral position.

References Cited in the file of this patent
UNITED STATES PATENTS

| | | |
|---|---|---|
| 2,942,572 | Pall | June 28, 1960 |
| 2,954,751 | Barnes | Oct. 4, 1960 |